United States Patent [19]

Satoh et al.

[11] Patent Number: 5,005,680
[45] Date of Patent: Apr. 9, 1991

[54] APPARATUS FOR CONTROLLING GEAR TRANSMISSION AND CLUTCH OF VEHICLES

[75] Inventors: Yuji Satoh; Hiromi Kono

[73] Assignee: Diesel Kiki Co., Ltd., Tokyo, Japan

[21] Appl. No.: 418,056

[22] Filed: Oct. 6, 1989

[30] Foreign Application Priority Data

Oct. 14, 1988 [JP] Japan .................. 63-257005

[51] Int. Cl.$^5$ ............................................. B60K 41/22
[52] U.S. Cl. .................................. 192/3.55; 74/862; 192/3.62
[58] Field of Search ............... 192/0.052, 0.092, 3.55, 192/3.61, 3.62, 30 W; 74/857, 862

[56] References Cited

U.S. PATENT DOCUMENTS

| 4,282,780 | 8/1981 | Totani et al. | 74/866 |
| 4,523,496 | 6/1985 | Fukunaga | 74/862 |
| 4,548,079 | 10/1985 | Klatt | 364/567 |
| 4,569,255 | 2/1986 | Holmes | 192/0.092 |
| 4,630,508 | 12/1986 | Klatt | 74/862 |
| 4,648,291 | 3/1987 | Klatt et al. | 74/866 |
| 4,662,491 | 5/1987 | Takefuta et al. | 192/0.052 |
| 4,854,194 | 8/1989 | Kaneko et al. | 74/862 |

FOREIGN PATENT DOCUMENTS

| 72922 | 4/1988 | Japan . |
| 115732 | 6/1988 | Japan . |
| 2199628 | 7/1988 | United Kingdom . |

Primary Examiner—Allan D. Herrmann
Assistant Examiner—Nicholas Whitelaw
Attorney, Agent, or Firm—Pollock, Vande Sande & Priddy

[57] ABSTRACT

In an vehicle control apparatus having an automatic gear shift control system for a gear transmission and an automatic clutch control system for a clutch, the apparatus comprises a setting device for setting a desired feeling for vehicle drive-off, and characteristic curves for controlling the engagement of the clutch and the setting of the gear position in the gear transmission are determined simultaneously in response to the setting device.

7 Claims, 7 Drawing Sheets

APPARATUS FOR CONTROLLING GEAR TRANSMISSION AND CLUTCH OF VEHICLES

TECHNICAL FIELD

The present invention relates to an apparatus for controlling the gear transmission and clutch of a vehicle taking into account the load condition of the vehicle so as to start the vehicle smoothly.

BACKGROUND OF THE INVENTION

In the prior art, there have been proposed various automatic transmission systems having a multistage gear transmission for, for example, trucks, and Japanese Patent Application Public Disclosure No. 115732/86 discloses a control system which is provided with a switch which can be set according to the load condition of the truck to make the feeling at drive-off of the truck the same between the fully loaded condition and the no-load condition of the truck. Furthermore, Japanese Patent Application Public Disclosure No. 72922/88 (corresponding to British Patent Application Public Disclosure No. 2199628) discloses a control system which provided with a variable resistor which can be set according to the load condition at that time for the same purpose. According to these prior art systems, in the case where the clutch is engaged for starting the truck, the operation speed of the clutch in a semi-engaging zone is determined in accordance with the position of the switch, enabling operation of the switch to eliminate the difference in the feeling of vehicle drive-off between at the fully loaded condition and at the no-load condition.

However, in the prior art system the driver must select the suitable gear shift position of the transmission for the load condition of the truck in addition to the operation of the switch when starting out, so that the operations required for starting the truck become complicated.

SUMMARY OF THE INVENTION

An object of the present invention is to provide an improved apparatus for controlling the gear transmission and clutch of vehicles, which is capable of eliminating the disadvantages described above.

Another object of the present invention is to provide a control apparatus for vehicles having a gear transmission and a clutch, which is capable of automatically controlling the gear transmission and the clutch for drive-off of the vehicle under various load conditions of the vehicle.

A further object of the present invention is to provide a control apparatus for vehicles having a gear transmission and a clutch, which is capable of assuring suitable control conditions of the gear transmission and the clutch for drive-off of the vehicle under various load conditions of the vehicle.

According to the present invention, in an apparatus for controlling a vehicle having an automatic gear shift control system for a gear transmission and an automatic clutch control system for a friction type clutch, the apparatus comprises a setting means for setting a desired feeling at vehicle drive-off, a first determining means for determining characteristics for engaging the clutch for drive-off of the vehicle in accordance with a set condition set by the setting means, and a second determining means for determining a gear position of the transmission at the drive-off of the vehicle in accordance with the set condition set by the setting means.

When the setting means is operated by the driver to set a desired condition according to, for example, the load condition of the vehicle, the characteristics for engaging the clutch and the gear position at drive-off of the vehicle are determined simultaneously in accordance with the desired condition set by the setting means. Thus, in the case where a series of control operations for drive-off of the vehicle are carried out, the gear transmission is automatically shifted into the gear position determined by the second determining means by means of the automatic gear shift control system and the operation for engaging the clutch is then carried out automatically on the basis of the characteristics determined by the second determining means by means of, for example, the automatic clutch control system.

According to another feature, in an apparatus for controlling a vehicle having an automatic gear shift control system for a gear transmission, the apparatus comprises an input means for inputting information concerning the load condition of the vehicle, a first determining means responsive to the input means for determining characteristics for engaging the clutch for drive-off of the vehicle, a gear discriminating means responsive to the input means for discriminating whether or not the gear position set in the gear transmission corresponds to a predetermined allowable gear position among one or more of such position for use at the time of drive-off of the vehicle, and means responsive to the first determining means and the gear discriminating means for carrying out the operation for engaging the clutch for driving off the vehicle in accordance with the characteristics determined by the first determining means only when the gear of the transmission is shifted to one of the allowable gear positions.

With this arrangement, the characteristics for engaging the clutch for drive off of the vehicle is determined by the first determining means in response to the information concerning the load condition of the vehicle from the input means. In addition, it is discriminated in accordance with the information whether or not the transmission is shifted to an allowable gear position for drive-off of the vehicle. The operation for engaging the clutch to start the vehicle can be carried out automatically on the basis of the characteristics for engaging the clutch determined by the first determining means only when the actual gear position of the transmission is one of the allowable gear positions.

BRIEF DESCRIPTION OF THE DRAWINGS

The invention will be better understood and other objects and advantages thereof will be more apparent from the following detailed description of preferred embodiments with reference to the accompanying drawings, in which.

DESCRIPTION OF THE PREFERRED EMBODIMENTS

Figure 1:
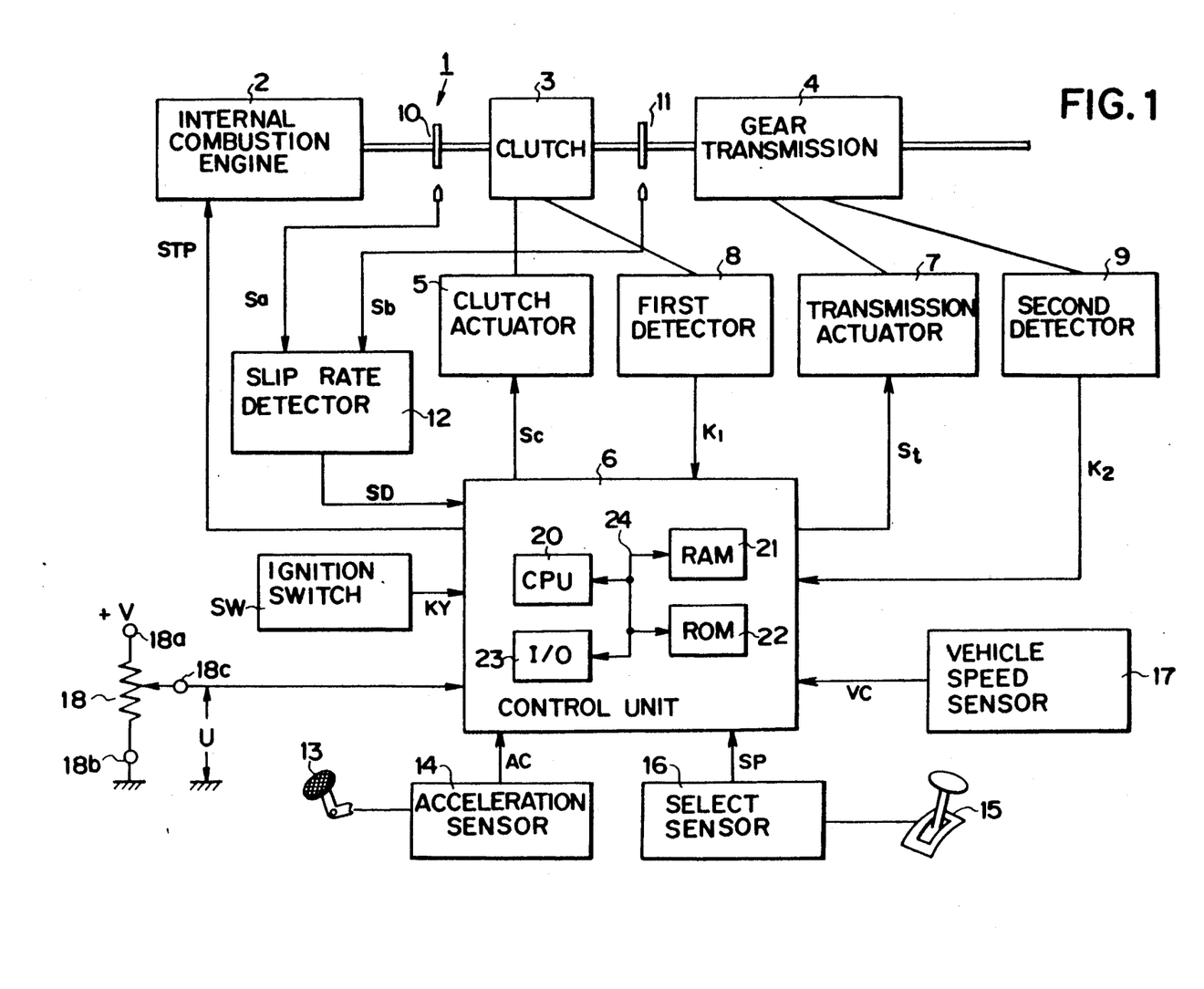
FIG. 1 is a view schematically showing an embodiment of a vehicle control apparatus according to the present invention, which is for controlling a vehicle powered by an internal combustion engine and having an automatic transmission system including a gear transmission and a friction type clutch.

FIG. 1 shows an embodiment of a vehicle control apparatus of the present invention having an automatic transmission system generally designated by reference numeral 1. The automatic transmission system 1 is used in a vehicle (not shown) powered by an internal combustion engine 2 and includes an automatic clutch control system for a friction type clutch 3 and an automatic gear shift control system for a gear transmission 4. A clutch actuator 5 is coupled with the clutch 3 and the operation for engaging/disengaging (ON/OFF) the clutch 3 is carried out by the clutch actuator 5 in response to a clutch control signal Sc produced by a control unit 6, which will be described in more detailed later. On the other hand, a transmission actuator 7 is coupled with the gear transmission 4 and the operation for shifting the gear transmission is carried out by the use of the transmission actuator in response to a transmission control signal St produced by the control unit 6.

A first detector 8 coupled with the clutch 3 produces a first detection signal $K_1$ showing the position of a pressure plate (not shown) of the clutch 3 manipulated by the clutch actuator 5, and a second detector 9 coupled with the gear transmission 4 produces a second detection signal $K_2$ showing the actual gear position of the gear transmission 4 manipulated by the transmission actuator 7. The first and second detection signals $K_1$ and $K_2$ are input to the control unit 6.

A first sensor 10 is provided on the input side of the clutch 3 for producing an input speed signal Sa showing the input rotational speed of the clutch 3 and a second sensor 11 is provided on the output side of the clutch 3 for producing an output speed signal Sb showing an output rotational speed of the clutch 3. The input and output speed signals Sa and Sb are supplied to the slip rate detector 12 for calculating a slip rate of the clutch 3 at each instant, and the slip rate signal SD representing the result of the calculation in the slip rate detector 12 is supplied from the slip rate detector 12 to the control unit 6.

The control unit 6 further receives an acceleration signal AC showing the amount of operation of an accelerator pedal 13 from an acceleration sensor 14 and a selected position signal SP showing the position selected by a selector 15 from a select sensor 16. A vehicle speed sensor 17 produces a vehicle speed signal VC showing the speed of the vehicle and supplies it to the control unit 6. The control unit 6 also receives an ignition switch signal KY showing whether or not an ignition switch SW is in its OFF position.

Reference numeral 18 designates a setting device for setting a desired feeling at drive-off of the vehicle. In this embodiment, the setting device 18 is constituted as a variable resistor having a pair of fixed terminals 18a and 18b and a direct current voltage source +V with a constant voltage level V is applied across the fixed terminals 18a and 18b. The output voltage of the setting device 18 is produced as a set voltage signal U from the movable terminal 18c of the variable resistor and the set voltage signal U is applied to the control unit 6.

Figure 2:
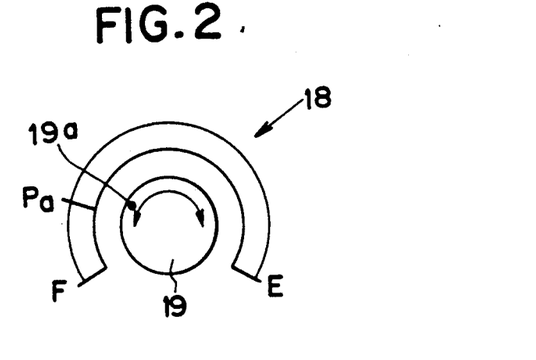
FIG. 2 is a front view showing the setting device of FIG. 1.

As illustrated in FIG. 2, the setting device 18 has an adjusting knob 19 with a mark 19a and the desired feeling at the start of the vehicle can be determined by setting the mark 19a at a point corresponding to the load condition of the vehicle at that time between a full load position "F" and a no-load (empty) position "E".

Figure 3:
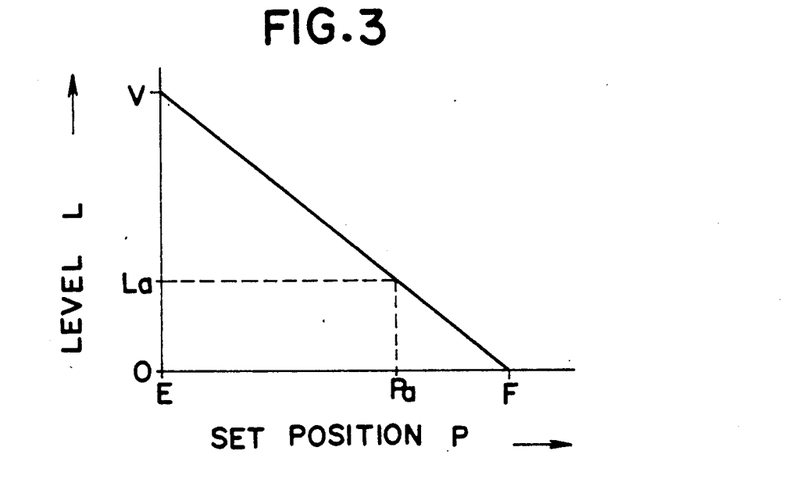
FIG. 3 is a graph showing the characteristics of the setting device.

FIG. 3 shows the relationship between the level L of the set voltage signal U and the set position P of the mark 19a. In this embodiment, the level L varies linearly from V to zero when the set position P is changed from the no-load position "E" to the full load position "F".

The control unit 6 has a central processing unit (CPU) 20, random access memory (RAM) 21, read-only memory (ROM) 22 and I/O interface 23, which are interconnected by a bus 24 to form a known-design microcomputer. A predetermined control program 30 is stored in the ROM 22 in advance for controlling the gear transmission 4 and the clutch 3. The signals input to the control unit 6 are converted into digital from by the I/O interface 23 and the required control operations of the clutch 3 and the transmission 4 are carried out on the basis of the control program 30 in accordance with the signals input to the control unit 6.

Figure 4:
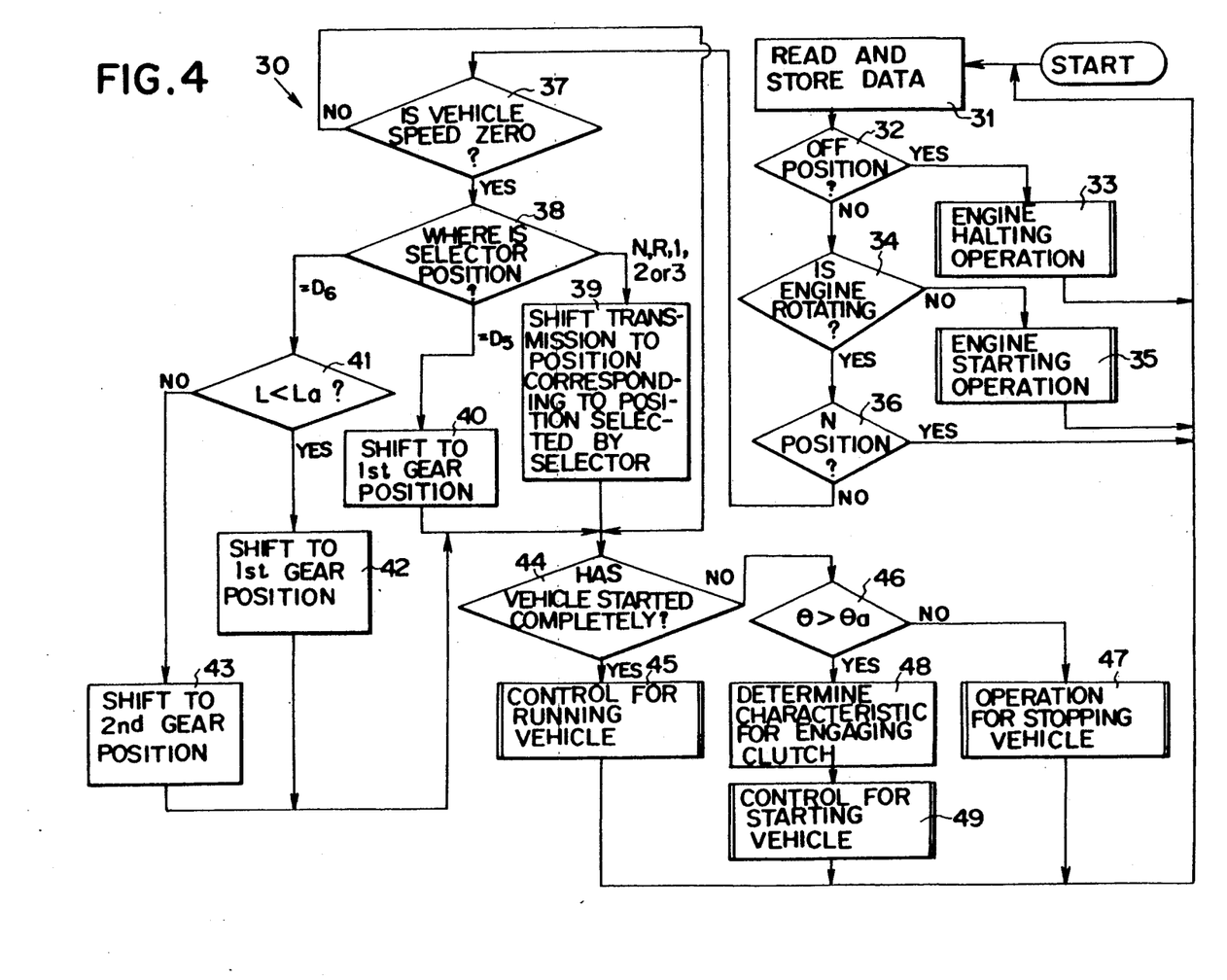
FIG. 4 is a flowchart showing a control program executed in the control unit of FIG. 1.

FIG. 4 is a flowchart showing the control program 30 executed in the control unit 6.

At the start of the execution of the control program 30, digital data corresponding to the signals input to the control unit 6 are read in and stored in the RAM 21 in step 31. Then, the operation moves to step 32, wherein discrimination is made as to whether or not the ignition switch SW is in its OFF position. When the determination in step 32 is YES, the operation moves to step 33 wherein a control operation for halting the operation of the internal combustion engine 2 is executed. As a result, a halt signal STP is produced from the control unit 6 and is applied to the internal combustion engine 2, so that the rotation of the internal combustion engine 2 is halted. The operation returns to step 31 after the execution of step 33.

When the ignition switch SW is in its ON or ST position, the determination in step 32 becomes NO and the operation moves to step 34, wherein discrimination is made as to whether or not the internal combustion engine 2 is rotating If the engine 2 is not rotating, the determination in step 34 becomes NO and the operation moves to step 35 to execute the control operation for starting the engine 2. The operation returns to step 31 after the execution of step 35. In contrast, when the engine 2 is rotating, the determination in step 34 becomes YES and the operation moves to step 36 wherein discrimination is made based on the second detection signal $K_2$ as to whether or not the gear of the transmission 4 is in its neutral (N) position. When the determination in step 36 is YES, the operation returns to step 31. In the case where the gear of the transmission 4 is in a position other than the neutral position, control operations are executed as follows.

When the determination in step 36 becomes NO, discrimination is made in step 37 in accordance with the vehicle speed signal VC as to whether or not the vehicle speed is zero. When the vehicle speed is zero, the operation moves to step 38 wherein the selected position of the selector 15 is discriminated from the selected position signal SP. In this embodiment, the selector 15 has seven positions: neutral (N), reverse (R), first (1st), second (2nd), $D_5$ (first automatic gear change position), and $D_6$ position (second automatic gear change position).

The $D_5$ position is for automatically selecting from among the first to the fifth gear positions of the transmission 4 the gear position for vehicle running suitable for the operation condition of the vehicle at each instant, and the first gear position is selected at drive-off of the vehicle when the $D_5$ position is selected. On the other hand, the $D_6$ position is for automatically selecting from among the first to the sixth gear positions of the transmission 4 the gear position for vehicle running suitable for the operation condition of the vehicle at each instant, and the first or second gear position is selected at drive-off of the vehicle when the $D_6$ position is selected.

When one of the positions of the selector 15 other than the $D_5$ and $D_6$ positions is selected, the operation moves to step 39 wherein the gear of the transmission 4 is shifted to the gear position corresponding to the position selected for drive-off of the vehicle by the selector 15. In the case where the $D_5$ position is selected by the selector 15, the operation moves to step 40 wherein the gear of the transmission 4 is shifted to the first gear position for drive-off of the vehicle. When the $D_6$ position is selected, the operation moves to step 41 wherein discrimination is made as to whether or not the level L of the set voltage signal U is less than a predetermined level La. The level La corresponds to the level obtained in the case where the mark 19a of the adjusting knob 19 is set at the position "Pa", as will be understood from FIG. 3. Consequently, the level L becomes less than the level La when the set position P is between "F" and "Pa", and the level L is equal to or greater than the level La when the set position P is between "Pa" and "E".

The determination in step 41 becomes YES when the level L is less than La, and the operation moves to step 42 wherein the transmission 4 is shifted to the first gear position for drive-off of the vehicle. That is, when the level L is not less than La because the load on the vehicle is large, the first gear at which large starting torque can be obtained is selected for drive-off of the vehicle. On the other hand, the determination in step 41 becomes NO when the level L is not less than La, and the operation moves to step 43 wherein the transmission 4 is shifted to the second gear position for drive-off of the vehicle. That is, when the level L is set not less than La because the load on the vehicle is amsll, the second gear position, which is suitable for smaller load condition, is selected for drive-off of the vehicle.

As described above, the gear position to be used for drive-off of the vehicle can be determined in accordance with the position selected by the selector 15 and, furthermore, the level of the set voltage signal U, if necessary, and the operation moves to step 44 after the transmission 4 has been shifted to the suitable gear position. When the determination in step 37 becomes NO, the operation moves to step 44 without execution of steps 38 to 43.

Discrimination is made in step 44 as to whether or not the operations for starting the vehicle have been completed. When the necessary operations for starting the vehicle are completed, the determination in step 44 becomes YES and the control operation for the running of the vehicle is carried out in step 45. The operation returns to step 31 after the execution of step 45.

The determination in step 44 becomes NO when the operations for starting the vehicle have not been completed, whereafter the operation moves to step 46 wherein the discrimination is made as to whether or not the amount $\theta$ of operation of the accelerator pedal 13 is more than a predetermined magnitude $\theta a$. When the amount $\theta$ is not more than $\theta a$, it is discriminated that the driver has no intention to drive the vehicle off and the determination in step 46 becomes NO. Thus, the operation moves to step 47 wherein the operations for stopping the vehicle are carried out, and returns to step 31 thereafter.

When the amount $\theta$ is more than $\theta a$, it is discriminated that the driver intends to start the vehicle and the determination in step 46 becomes YES. Thus, the operation moves to step 48 wherein the engagement characteristic for the clutch 3 is determined in accordance with the level L of the set voltage signal U.

Figure 5:
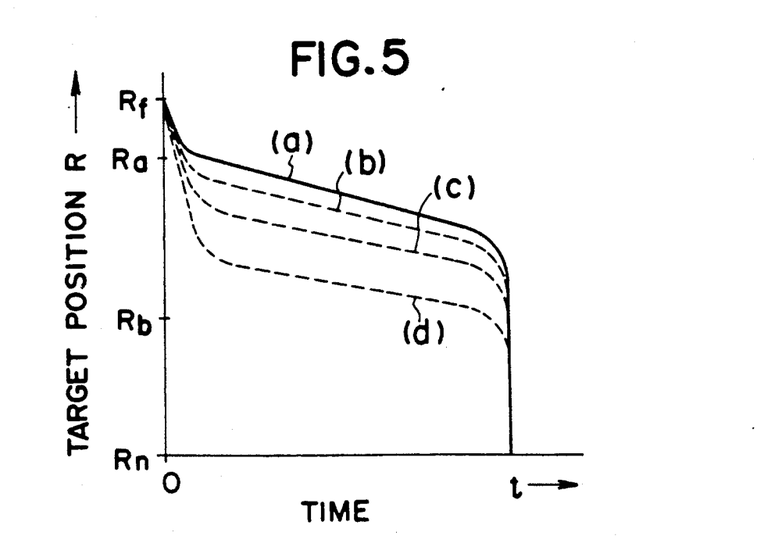
FIG. 5 is a graph showing the engagement characteristics of the clutch of FIG. 1.

FIG. 5 shows characteristic curves of time-course patterns for engaging the clutch 3 for drive-off of the vehicle, wherein time t is plotted on the abscissa and the target position R of the pressure plate (not shown) of the clutch 3 is plotted on the ordinate The position of the pressure plate will be Rf when the pressure plate has fully moved toward clutch OFF so that the clutch 3 is in its completely disengaged state. The position of the pressure plate will be Rn when the pressure plate has fully moved toward clutch ON so that the clutch 3 is in its completely engaged state. The clutch 3 is in a semi-engaged state within the range of Ra > R > Rb. Each of the characteristic curves of FIG. 5 shows a time-course pattern which represents the target position R of the pressure plate of the clutch 3 at each instant after the start of the clutch engaging operation is commanded at t=0.

In step 48 one of the characteristic curves (a) to (d) is selected in accordance with the level L of the set voltage signal U. The characteristic curve (a) is selected for no-load condition of the vehicle and the characteristic curve (d) is selected for a full load condition. The characteristic curves (b) and (c) for a medium load condition are properly selected in accordance with the setting of the adjusting knob 19. However, the present invention is not limited to the embodiment described above. That is, the characteristic curve to be selected is not limited the above four curves (a) to (d), and two or more characteristic curves representing any desired patterns may be used. Furthermore, the desired characteristic curve can be obtained by successively changing or modifying, for example, the characteristic curve (a) in accordance with the level L.

After the suitable characteristic curve for engaging the clutch 3 has been determined in step 48 as described above, the operation moves to step 49 wherein the control operation for drive-off of the vehicle is carried out. Specifically, the gear transmission 4 has already been shifted to the determined gear position and the clutch 3 is engaged in accordance with the characteristic curve determined in step 48. The clutch control signal Sc corresponds to the target position R determined on the basis of the selected characteristic curve at each instant after t=0 and the pressure plate of the clutch 3 is positioned by the clutch actuator 5 to the location indicated by the clutch control signal Sc. That is, the clutch control signal Sc is applied as a signal indicating the target position of the pressure plate of the clutch 3 to the clutch actuator 5 and the pressure plate is positioned to the target position indicated by the clutch control signal Sc by means of the clutch actuator 5. The operation moves to step 32 after the execution of step 49.

The determination in step 44 becomes YES when these control operations for drive-off of the vehicle have been completed, and the operation moves to step 45 wherein the control operations for vehicle running are carried out.

In the arrangement described above, the set voltage signal U is produced by the setting device 18 in accordance with the load condition set therein. In the case where the selector 15 is set to the $D_6$ position, both the gear position at vehicle drive-off and the characteristic curve for engaging the clutch for vehicle drive-off are determined at the same time in response to the set voltage signal U. That is, the first gear is selected for vehicle drive-off when the vehicle load set by the setting device 18 is large, and the second gear is selected when the vehicle load set by the setting device 18 is small. At the same time, the characteristic curve for engaging the clutch 3 for vehicle drive-off is determined in such a way that, as shown in FIG. 5, the rate of the movement of the pressure plate just after the start of the clutch engagement becomes larger with increase in the vehicle load set by the setting device 18, whereby an excellent feeling at vehicle drive-off is assured regardless of the magnitude of the load of the vehicle and the clutch is reliably protected from rapid wear.

Furthermore, since both the gear position and the clutch engagement characteristics at drive-off of the vehicle can be simultaneously determined merely by setting of the setting device, both can be easily determined in a well-matched condition, whereby the driver is able to operate the vehicle easily.

Figure 6:
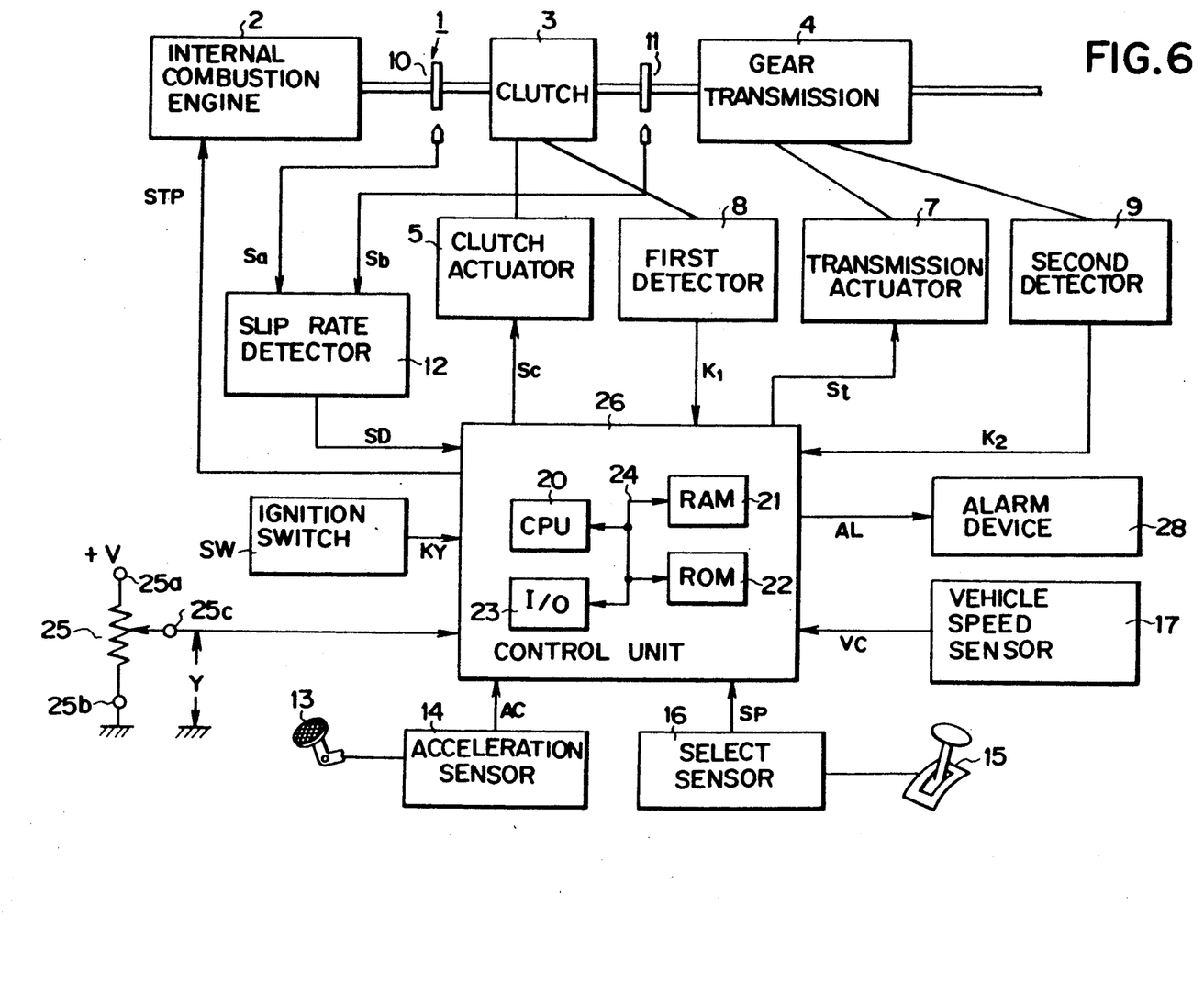
FIG. 6 is a view schematically showing another embodiment of a vehicle control apparatus of the present invention.

FIG. 6 shows another embodiment of a vehicle control apparatus according to the present invention. The vehicle control apparatus shown in FIG. 6 comprises an input device 25 for inputting information concerning the load condition of the vehicle, and an output signal Y produced by the input device 25 is supplied as a signal indicative of the load condition of the vehicle to the control unit 26. The input device 25 is constituted as a variable resistor having a pair of fixed terminals 25a and 25b, and a direct current voltage source +V with a constant voltage level V is applied across the fixed terminals 25a and 25b. The output voltage of the input device 25 is produced as an output signal Y from the movable terminal 25c of the variable resistor and applied to the control unit 26. The control unit 26 operates on the basis of a control program 60 stored in the ROM 22 for controlling the gear transmission 4 and the friction type clutch 3. Reference numeral 28 designates an alarm device. In FIG. 6, the portions corresponding to those in FIG. 1 are designated by the same reference numerals and the descriptions thereof are not given here.

Figure 7:
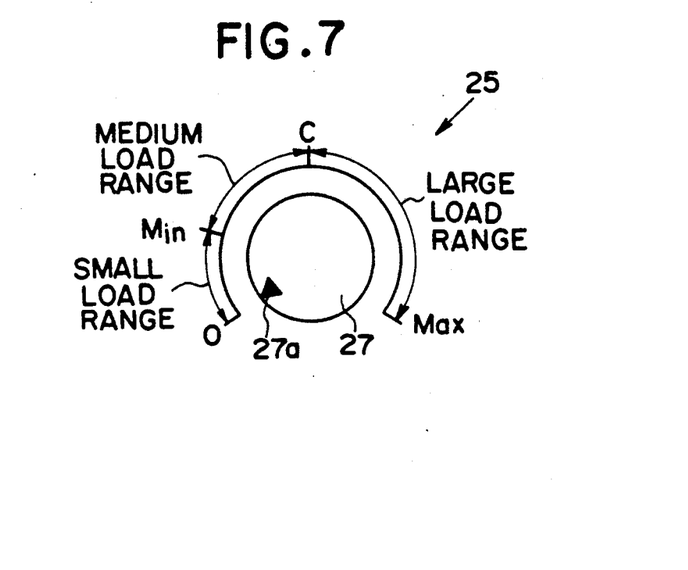
FIG. 7 is a front view showing the input device of FIG. 6.

Referring to FIG. 7, the input device 25 has an adjusting knob 27 secured on the rotating shaft (not shown) of the variable resistor and a mark 27a on the adjusting knob 27 can be positioned at any position between "O" position and "Max" position. The position of the mark 27a will be referred to as the set position AP hereinafter. The region between "O" and "Max" is divided into three ranges: a small load range ($I \leq AP < Min$), a medium load range ($Min \leq AP < C$) and a large load range ($C \leq AP \leq Max$).

Figure 8:
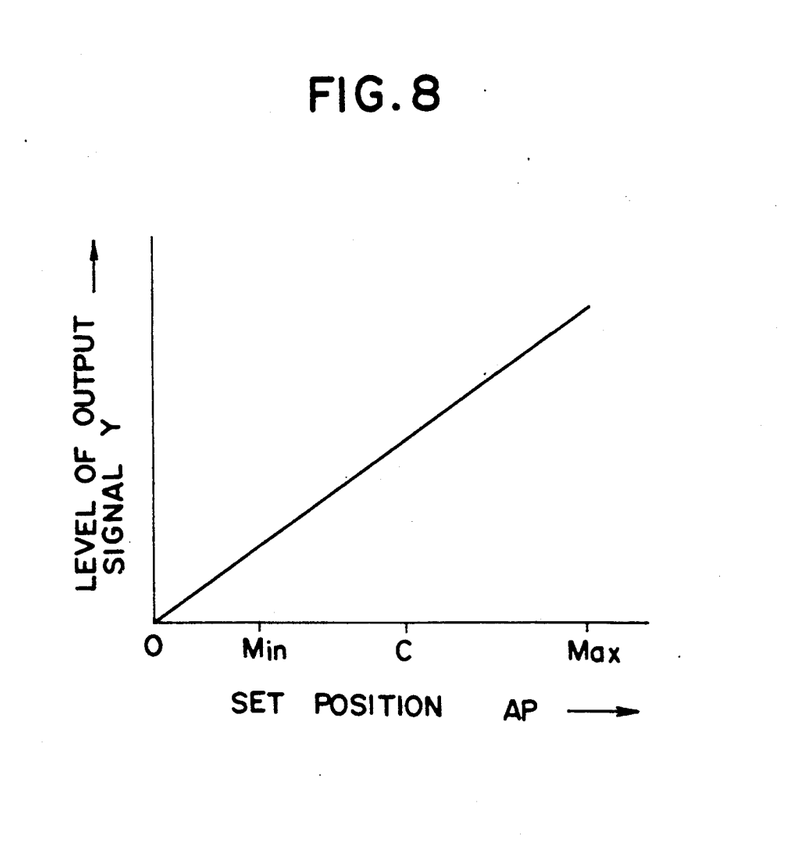
FIG. 8 is a graph showing the characteristics of the input device.

FIG. 8 shows the relationship between the level of the output signal Y and the set position AP, in which the level of the output signal Y is dependent upon the set position AP. In this embodiment, the level of the output signal Y varies linearly from .V to zero when the set position AP proceeds from "O" "Max". When the position of the knob 27 is adjusted by the driver according to the load condition of the vehicle at that time, an output signal Y of a level corresponding to the set position AP at that time is supplied to the control unit 26. The input device 25 may include a well-known mechanism for maintaining the set position AP thereof by a suitable force when the mark 27a is set at the "O" position.

Figure 9:
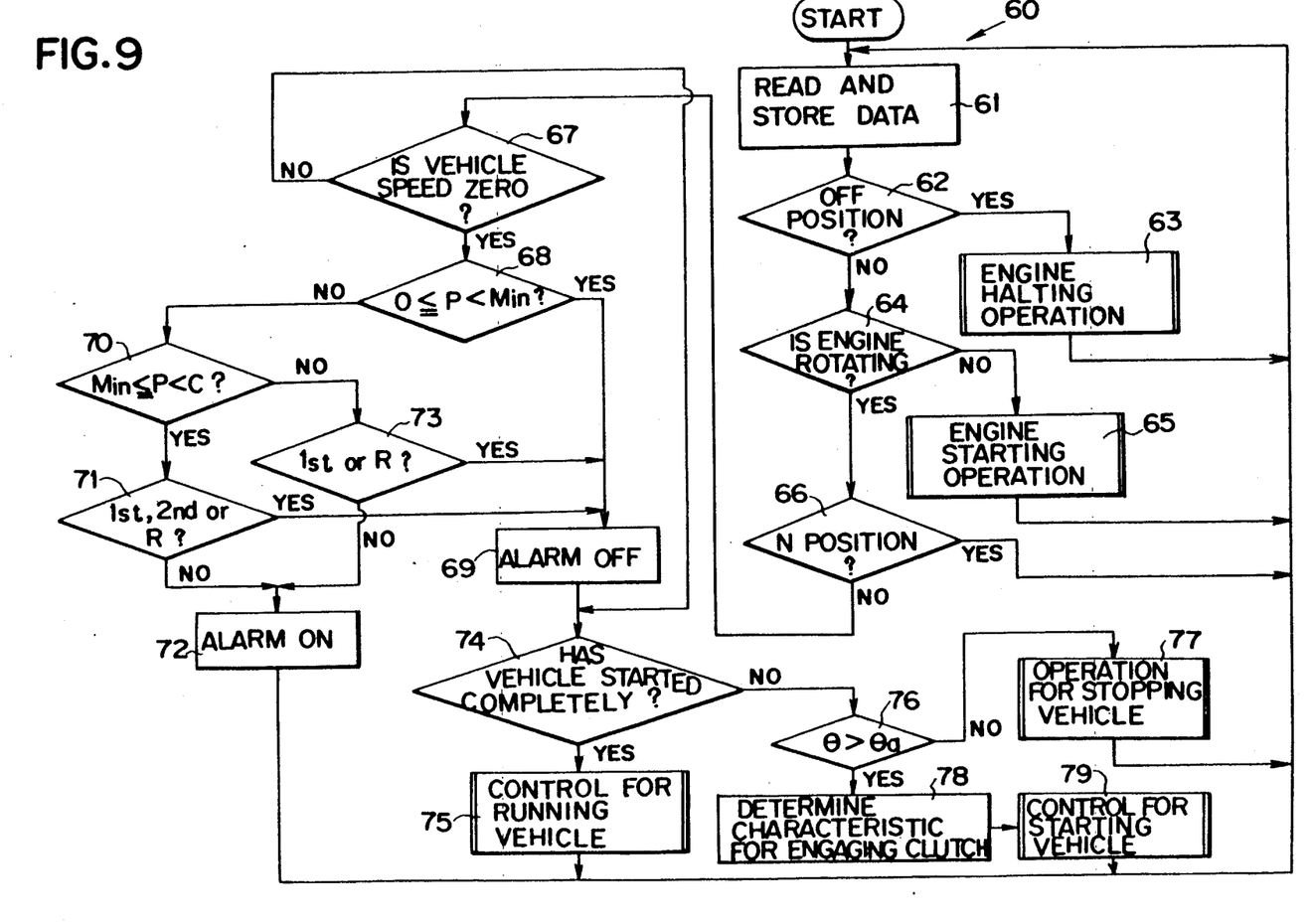
FIG. 9 is a flowchart showing a control program executed in the control unit of FIG. 6.

FIG. 9 is a flowchart showing the control program 60 executed in the control unit 6.

At the start of the execution of the control program 60, digital data corresponding to the signals input to the control unit 26 are read in and stored in the RAM 21 in step 61. Then, the operation moves to step 62 wherein discrimination is made as to whether or not the ignition switch SW is in its OFF position. When the determination in step 62 is YES, the operation moves to step 63 wherein a control operation for halting the operation of the internal combustion engine 2 is executed. As a result, a halt signal STP is produced from the control unit 26 and is applied to the internal combustion engine 2, so that the rotation of the internal combustion engine 2 is halted. The operation returns to step 61 after the execution of step 63.

When the ignition switch SW is in its ON or ST position, the determination in step 62 becomes NO and the operation moves to step 64, wherein discrimination is made as to whether or not the internal combustion engine 2 is rotating. When the engine 2 is not rotating, the determination in step 64 becomes NO and the operation moves to step 65 to execute the control operation for starting the engine 2. The operation returns to step 61 after the execution of step 65. In contrast, when the engine 2 is rotating, the determination in step 64 becomes YES and the operation moves to step 66 wherein discrimination is made based on the second detection signal $K_2$ as to whether or not the gear of the transmission 4 is in its neutral(N) position. When the determination in step 66 is YES, the operation returns to step 61. In the case where the gear of the transmission 4 is a position other than the neutral position, control operations are executed as follows.

When the determination in step 66 becomes NO, discrimination is made in step 67 in accordance with the vehicle speed signal VC as to whether or not the vehicle speed is zero. The operation moves to step 74 when the vehicle speed is not zero. In contrast, when the vehicle speed is zero, the operation moves to step 68 wherein discrimination is made on the basis of the output signal Y as to whether or not the set position AP is within the small load range ($O \leq AP < Min$). The determination in step 68 is YES when the set position AP is in the small load range and the operation moves to step 69 wherein an alarm signal AL of low level is produced to put the alarm device 28 an inoperative state. If the determination in step 68 becomes NO, the operation moves to step 70 wherein discrimination is made on the basis of the output signal V as to whether or not the set position AP is within the medium load range (Min-≦AP<C). When the determination in step 70 is YES, and discrimination is made in step 71 as to whether or not the transmission 4 is in the 1st, 2nd or R gear position. The operation moves to step 69 when the determination in step 71 is YES. On the other hand, when the determination in step 71 is NO the operation moves to step 72 wherein an alarm signal AL of high level is produced to put the alarm device 28 an operative state. The alarm device 28 may be an alarm lamp, an alarm buzzer or any other well-known suitable alarm apparatus, able to inform the driver that it has received the alarm signal of high level.

The determination in step 70 becomes NO when the set position AP is set within the large load range, and then the operation moves to step 73 wherein discrimination is made as to whether or not the transmission 4 is in the 1st or R gear position. The operation moves to step 69 when the determination in step 73 is YES. In contrast, step 72 is executed after the execution of step 73 when the determination in step 73 is NO.

As described above, in the case where the set position AP is within the small load range, the alarm device 28 does not operate no matter which gear position is used at vehicle drive-off. However, in the case where the set position AP is within the medium or large load range, step 69 is executed only when a specific gear position is set for drive-off of the vehicle, and the alarm device 28 is rendered operative when a gear position other than the specific gear position is used for vehicle drive-off. When the alarm device 28 operates, the operation returns to step 62 without execution of the control operation for vehicle drive-off. On the other hand, in the case where the operation moves to step 69, the operation further moves to step 74 and the following control operations are carried out.

Discrimination is made in step 74 as to whether or not the operations for vehicle drive-off have been completed. When the necessary operations for vehicle drive-off have been completed, the determination in step 74 becomes YES and the control operation for running of the vehicle is carried out in step 75. The operation returns to step 61 after the execution of step 75.

The determination in step 74 becomes NO when the operations for vehicle drive-off has not been completed, and the operation moves to step 76 wherein discrimination is made as to whether or not the amount $\theta$ of operation of the accelerator pedal 13 is more than a predetermined magnitude $\theta a$. When the amount $\theta$ is not more than $\theta a$, it is discriminated that the driver has no intention to start the vehicle and the determination in step 76 becomes NO. Thus, the operation moves to step 77 wherein the operations for stopping the vehicle are carried out, and returns to step 61 thereafter.

When the amount $\theta$ is more than $\theta a$, it is discriminated that the driver intends to start the vehicle and the determination in step 76 becomes YES. Thus, the operation moves to step 78 wherein the characteristic curve for engaging the clutch 3 is determined in accordance with the level of the output signal Y.

The determination of the characteristic curve for engaging the clutch in step 78 may be carried out similarly to the manner used in the embodiment of FIG. 1 and described in conjunction with FIG. 5. However, the characteristic curve for engaging the clutch 3 may alternatively be determined so as to shift the basic characteristic curve shown by the solid line toward clutch ON by a value f(Y) corresponding to the level of the output signal Y to obtain the characteristic curve shown by the broken line in FIG. 10. In the graph shown in FIG. 10, the amount $\theta$ of operation of the accelerator pedal 13 is plotted on the abscissa and the target position T of the pressure plate of the clutch 3 is plotted on the ordinate. In this case, a target characteristic curve is determined in accordance with the amount $\theta$ of operation of the accelerator pedal 13 at that time.

Figure 10:
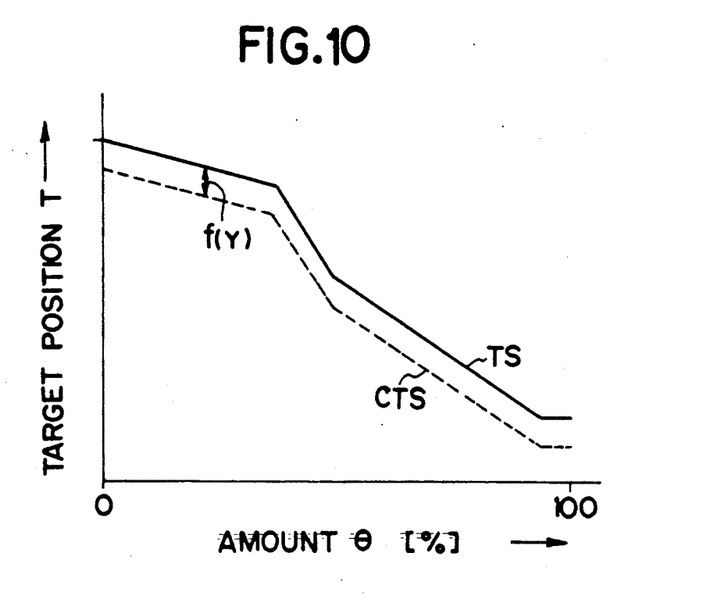
FIG. 10 is a graph showing the engagement characteristics of the clutch of FIG. 6.
Figure 11:
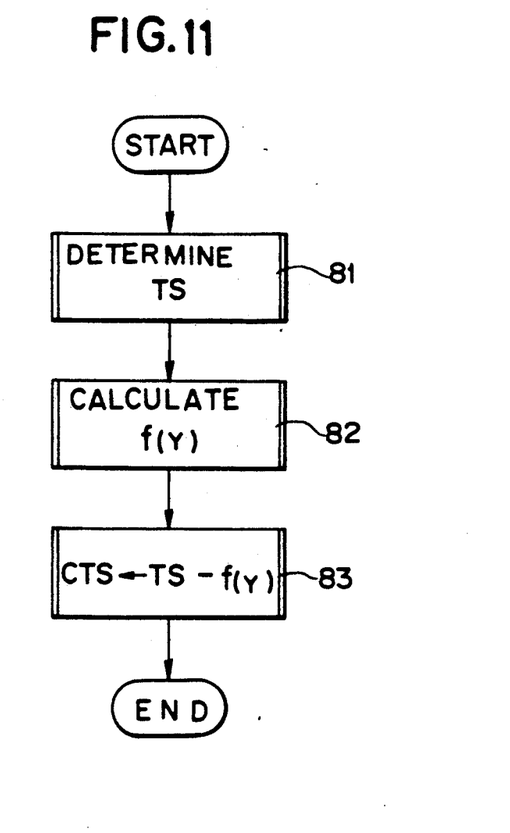
FIG. 11 is a flowchart showing a program for determining the engagement characteristics of the clutch of FIG. 6, which is executed in the control unit of FIG. 6.

FIG. 11 is a flowchart showing a program for determining the characteristic map data for engaging the clutch 3 as described in conjunction with FIG. 10. According to the program shown in FIG. 11, the basic characteristic map data TS is determined in step 81. In this case, the map data corresponding to the basic characteristic curve shown in FIG. 10 is selected and stored in the RAM 21. Then, the value f(Y) is calculated in step 82 on the basis of a predetermined function of the level of the output signal Y in accordance with the level of the output signal Y. The operation then moves to step 83, wherein the desired characteristic map data CTS is obtained by correcting the map data TS by the value f(Y).

After the suitable characteristic curve for engaging the clutch 3 has been determined as described above in step 78, the operation moves to step 79 wherein the control operation for vehicle drive-off is carried out. That is, under the condition that the transmission 4 has been shifted to the gear position determined, the clutch 3 is engaged in accordance with the characteristic curve determined in step 78. The clutch control signal Sc corresponds to the target position T determined on the basis of the characteristic map data CTS at each instant and the pressure plate of the clutch 3 is positioned by the clutch actuator 5 to the location indicated by the clutch control signal Sc. The operation returns to step 61 after the execution of step 79.

Thus, the determination in step 74 becomes YES when these control operations for vehicle drive-off have been completed, and the operation moves to step 75 wherein the control operations for vehicle running are carried out.

With the arrangement described above, when the set position AP is set by means of the input device 25 in accordance with the load condition of the vehicle at that time, the output signal Y with the level corresponding to the set position AP is applied to the control unit 26, and it is discriminated on the basis of the output signal Y whether or not the actual set gear position for vehicle drive-off is an allowable gear position. In this embodiment, the load condition of the vehicle is divided into the three ranges and the specific allowable gear positions are determined for each range. The control operations for vehicle drive-off are carried out when the set gear position corresponds to the allowable position for the load condition set by the input device 25 at that time. In contrast, the alarm device 28 is rendered operative without performance of the control operations for vehicle drive-off when the set gear position does not correspond to an allowable position for the load condition set by the input device 25 at that time.

Furthermore, the characteristic curve for engaging the clutch for vehicle drive-off is determined in accordance with the set position AP in such a way that a feeling of clutch slipping is not experienced even under heavy load condition, so that the life of the clutch becomes longer.

What is claimed is:

1. An apparatus for controlling a vehicle having an automatic gear shift control system for a gear transmission, said apparatus comprising:
   an input means for inputting information concerning a load condition of the vehicle;
   a first determining means responsive to said input means for determining characteristic curves for engaging the clutch for vehicle drive-off;
   a gear discriminating means responsive to said input means for discriminating whether or not a gear position set in the gear transmission corresponds to a predetermined allowable gear position at the time of vehicle drive-off; and
   an engaging means responsive to said first determining means and said gear discriminating means for carrying out the operation for engaging the clutch during vehicle drive-off in accordance with the characteristic curve determined by said first determining means only when the gear of the transmission is shifted to an allowable gear position.

2. An apparatus as claimed in claim 1, wherein said input means includes a voltage producing means for producing an output signal with a level corresponding to the information concerning the load condition.

3. An apparatus as claimed in claim 2, wherein the level of the output signal is determined with reference to the magnitude of the input load condition.

4. An apparatus as claimed in claim 3, wherein said gear discriminating means has means for detecting the actual gear shift position of the gear transmission at vehicle drive-off, means responsive to said input means for discriminating to which range the input load condition belongs among a plurality of prescribed load ranges for each of which a specific allowable gear position or positions are determined in advance, and means for detecting whether or not the actual gear position corresponding to any allowable gear position determined for the load range corresponding to the input load condition.

5. An apparatus as claimed in claim 1 further comprising means responsive to said gear discriminating means for producing alarm information when the gear position set in the gear transmission does not correspond to the allowable gear position.

6. An apparatus as claimed in claim 1, wherein said first determining means determines a suitable characteristic curve for engaging the clutch by selecting one from among a plurality of characteristic curves in accordance with the information input by said input means.

7. An apparatus as claimed in claim 1, wherein said first determining means determines a suitable characteristic curve for engaging the clutch by modifying a prescribed characteristic curve in accordance with the information input by said input means.

* * * * *